United States Patent [19]

Yoshino et al.

[11] Patent Number: 5,042,920
[45] Date of Patent: Aug. 27, 1991

[54] LIQUID CRYSTAL DISPLAY DEVICE AND COLOR FILTER FOR USE WITH THE LIQUID CRYSTAL DISPLAY DEVICE WITH TWO RESIN LAYERS OVER THE COLOR FILTER

[75] Inventors: Thunekazu Yoshino, Kamakura; Tomiya Sonoda, Machida, both of Japan

[73] Assignee: Kabushiki Kaisha Toshiba, Kawasaki, Japan

[21] Appl. No.: 434,004

[22] Filed: Nov. 9, 1989

[30] Foreign Application Priority Data

Nov. 10, 1988 [JP] Japan .................. 63-282441
Jan. 10, 1989 [JP] Japan ...................... 1-1978
Jan. 11, 1989 [JP] Japan ...................... 1-2923

[51] Int. Cl.$^5$ ............................................. G02F 1/133
[52] U.S. Cl. ..................................... 359/68; 359/891
[58] Field of Search ............... 350/339 R, 339 F, 317

[56] References Cited

U.S. PATENT DOCUMENTS

| 4,593,978 | 6/1986 | Mourey et al. | 350/339 F |
| 4,597,637 | 7/1986 | Ohta | 350/339 R |
| 4,779,957 | 10/1988 | Suginoya et al. | 350/339 F |
| 4,929,060 | 5/1990 | Sugimoto et al. | 350/339 R |

FOREIGN PATENT DOCUMENTS

| 0226218 | 6/1987 | European Pat. Off. | 350/339 F |
| 50-126121 | 10/1975 | Japan . | |
| 61-3122A | 1/1986 | Japan . | |
| 61-3123 | 1/1986 | Japan . | |
| 61-198131A | 9/1986 | Japan . | |

Primary Examiner—Stanley D. Miller
Assistant Examiner—Anita Pellman Gross
Attorney, Agent, or Firm—Cushman, Darby & Cushman

[57] ABSTRACT

A color filter for use with a liquid crystal display is disclosed. The color filter has colored layers printed on a transparent substrate and first and second resin layers coated on the colored layers.

13 Claims, 7 Drawing Sheets

LIQUID CRYSTAL DISPLAY DEVICE AND COLOR FILTER FOR USE WITH THE LIQUID CRYSTAL DISPLAY DEVICE WITH TWO RESIN LAYERS OVER THE COLOR FILTER

BACKGROUND OF THE INVENTION

1. Field of the Invention

The present invention relates to a liquid crystal display device, and more particularly, it relates to a color filter for use with the liquid crystal display device and a method of making the color filter.

2. Description of the Related Art

The liquid crystal display device has been widely used these days as a display suitable for use with televisions, office automation machines and the like. This is because power consumed by the liquid crystal display device is small and because the device is light in weight and thin in thickness. It is, however, necessary that the liquid crystal display device having these merits can be made larger in size and display images of high quality with respect to color. This causes much attention to be paid to the color filter for use with the liquid crystal display device.

The color filter for use with the liquid crystal display device was conventionally made according to the dying method in which the lithography technique was employed. This dying method includes many lithography steps, thereby causing the cost of manufacturing the liquid crystal display device to be made high. This causes costs of machines each having the liquid crystal display device to be made higher.

Therefore, the print process by which the liquid crystal display device can be manufactured at a lower cost than by the dying method attracted attention. According to the print process, the color filter and the like are made by printing manner. In the case of the color filter made according to the print process, however, foreign matters such as dust are likely to enter into the filter and the surface of the color filter is likely to be undulated. When the surface of the color filter is heavily undulated, it becomes difficult to form the transparent electrode or orientation film on the color filter. This causes the quality of display to become low. The color filter made according to the print process was low in cost but not suitable for practical uses.

Preliminarily-opened Japanese Patent Applications Sho 61-3122 and -3123 disclose a method of making the color filter to eliminate the above-mentioned drawbacks. According to this method, surfaces of colored layers formed by the print process can be polished flat to provide the color filter without giving any influence to the transparent conductive film and the like. More specifically, the method of making the liquid crystal color display element comprises printing opaque portions on the surface of a substrate at a certain interval, printing colored layers between the opaque portions and polishing the colored layers flat.

According to the method disclosed, the surfaces of the colored layers can be polished flat even when the colored layers have unevenness on the surfaces thereof after they are formed, to thereby make a color filter suitable for use with the liquid crystal display device.

Usually, the colored layers of the color filter are made of organic resin including pigment or dye therein and baked at a certain temperature. These colored layers are soft because they are made of resin, and they are a thin film having a thickness of several microns. The technique of directly abrading these colored layers flat becomes more difficult as the size of the substrate on which the colored layers are formed becomes larger. This is because the color layers are likely to be peeled off from the base when they are directly polished. It was therefore impossible to produce the color filter on a mass scale and at a low cost.

SUMMARY OF THE INVENTION

The object of the present invention is to provide a liquid crystal display device having a color filter that can be polished to have flat surfaces and which can be produced on a mass scale. The object of the present invention is also to provide the color filter and a method of manufacturing the color filter.

A liquid crystal display device according to the present invention comprises a first substrate comprising a color filter having a transparent colored layer and plural resin layers laminated on the colored layer, a first electrode, and a transparent substrate, and the filter and the electrode are provided on the transparent substrate, and a second substrate having a second electrode, a liquid crystal component sandwiched between the first and second substrate, means for supplying the predetermined voltage to the first and second electrodes.

A color filter according to the present invention comprises a transparent substrate, a transparent color layer arranged on the transparent substrate, and first and second resin layers laminated on the color layer in order.

A method of manufacturing the color filter according to the present invention comprises steps of forming a transparent color layer on a transparent substrate by printing, and forming plural resin layers on the color layer.

According to the present invention, even the colored layers are formed by the print process, the surface of the color filter can be flat, thereby enabling the color filter to be produced on a mass scale and at a lower cost.

As mentioned above, two organic resin layers are formed on the colored layers. The colored layers formed by use of the print process have rough surfaces, but since they are overlaid with the organic resin layers, the surface of the color filter is not very undulated. Therefore, an ITO (indium tin oxide) film serving as an electrode can be accurately arranged on the resin layers. It should be noted that the organic resin layers are easier to form than an inorganic layer and do not require a high manufacturing cost. It should be also noted that the inorganic layer has to be subjected to high-temperature heat treatment during the manufacturing process, with the result that it is very likely that the color filter comprising the inorganic layer will be adversely affected in quality. Such high-temperature heat treatment is not necessary in the manufacture of the organic resin layers. Moreover, the organic resin layers are made up of two layers, one of which has good adhesion to a color filter, and the other of which enables an ITO film to be reliably formed thereon.

That is, as mentioned above, in view of the characteristics of the color portions, it is very difficult to directly work the color filters of several micron thickness on a large-sized substrate. That is, the surface of the colored layers may be rendered rough when the colored layers are worked. In the present invention, therefore, a material which is hard to work is formed on the colored layers as a first layer, and the substrate is worked through the use of the first layer. The experiments conducted by the inventors showed that polishing was most desirable among various working methods, and that the first layer should be harder to work than at least the colored layers.

If lapping is performed, the surface of the colored layers can be made smooth and specular. However, lapping is not suitable for working a color filter for use in a large-screen liquid crystal display device. If lapping is performed for working the color filter, the end portions of that color filter are worked unevenly, so that the thickness of the color filter will not be uniform. If polishing is performed, in contrast, the surface of the colored layers is worked with the hairs or fibers of a brush (abrasives may be used, if desired). Although the surface of the colored layers cannot be made specular completely by polishing, it is uniformly worked and such protruding portions as would adversely affect the arrangement of an orientation film are removed from the colored layers. For this reason, polishing is most desirable in the case of the present invention.

The "polishing characteristic" referred to in this specification is not represented merely by the Brinell hardness, Rockwell hardness, or the like, but includes other factors, such as a tensile strength and an elastic modulus. In other words, the polishing characteristic is determined by the length of time required for a certain material to be polished into a predetermined condition. Therefore, if a material has a low anti-polishing characteristic, it is easily abraded. If the colored layers are covered with a material having a low anti-polishing characteristic, the polishing will be difficult to control, just as in the case where colored layers having a low anti-polishing characteristic are directly polished. If the colored layers are covered with a material having a high anti-polishing characteristic, the time required for the polishing will be long, resulting in a decrease in the manufacturing efficiency.

As may be understood from the above, a material with which to cover the colored layers should have an anti-polishing characteristic higher than that of the colored layers. Preferably, the anti-polishing characteristic of the material is equal to, or higher than, that of blue plate glass. Examples of a material which has an anti-polishing characteristic higher than that of the colored layers and which is suitable for use as a color filter of a liquid crystal display device are epoxy resin, polyimide resin, polyamide resin, silicone resin, or a mixture of these kinds of resin. After coated, such resins are pre-hardened to a predetermined extent. After subjected to polishing, the resins are fully hardened. Thus, the resins are easy to polish.

The second layer is formed over the first layer. If the first layer is thin, the color portions are also polished when the first layer is polished. Conversely, if the first layer is thick, the colored layers are not polished when the first layer is polished.

It is desirable that a colored layer constituting part of a color filter be manufactured in a clean room which is kept as clean as possible. If not, dust particles having various sizes will be included in the colored layer. If the dust particles are large, they may adversely affect both the pixels of the color filter and the gap of the liquid crystal cell. Therefore, in order to improve the manufacturing yield, such dust particles should be eliminated.

When the thin first layer is polished, its protruding portions are abraded well, due to the inclusion of dust. If the polishing is further continued, the colored layers located below the first layer are exposed since the first layer is thin. Since the colored layers have an anti-polishing characteristic lower than that of the first layer, they are abraded more than the first layer. If a dust particle exists under a protruding portion of the exposed colored layers, it is removed as a result of the polishing, thus leaving a depression portion in the colored layers. Since the second layer is formed on the first layer and on the exposed colored layers, the depression portion formed after the removal of the dust particle is filled with the second layer. As a result, the surface of the color filter is flattened. In this manner, the present invention enables color filters to be manufactured at a low cost and with no need for a very clean room.

If the first layer is thick, the colored layers are not abraded. In this case, dust particles in the colored layers are not removed, and thus no depression portion is formed. However, the first layer is uniformly abraded since the colored layers are not abraded. As a result, a color filter having a smoother surface is obtained.

If the material with which to cover the colored layers is not firmly adhered to the colored layers, it may peel or separate from the colored layers. This problem can be solved by providing a double-layered coating on the colored layers. More specifically, the first layer which can be firmly adhered to the colored layers is formed on the color layers, and then the second layer having an anti-polishing characteristic higher than that of the colored layers is formed on the first layer. In general, a material having good wettability provides reliable adhesion. In consideration of this fact, the material of an adhesive layer to be used in the present invention is chosen as follows. First of all, a smooth-surface film is formed on a colored layer by use of the same resin as colored layers and a layer coated on the colored layers. Thereafter, a solution with which to formed the adhesive layer is dropped onto the colored layer. The contact angle between the dropped solution and the smooth-surface film and the rate of expansion of the dropped solution on the smooth-surface film are measured, to thereby judge the wettability. After examining the wettability with respect to various materials, it was found out that acrylate resin, alkyd resin, polyamide resin, etc. were suitable for use as the material of the adhesive layer. This adhesive layer should be as thin as possible, so as to prevent inclusion of air.

The second layer having a high anti-polishing characteristic is formed over the first layer, and is abraded by polishing. The first layer does not peel off the colored layers since it provides reliable adhesion to the colored layers, while the second layer is uniformly abraded since it has a high anti-polishing characteristic. As a result, a color filter having a smooth surface can be obtained.

If desired, a third layer may be formed over the polished second layer. This third layer is formed of a material which permits an ITO film to be reliably formed thereon. If the ITO film is reliably formed on the third layer, color filters can be manufactured on a larger scale.

DETAILED DESCRIPTION OF THE PREFERRED EMBODIMENTS

Embodiments of the present invention will now be described, with reference to the accompanying drawings.

Figure 1:
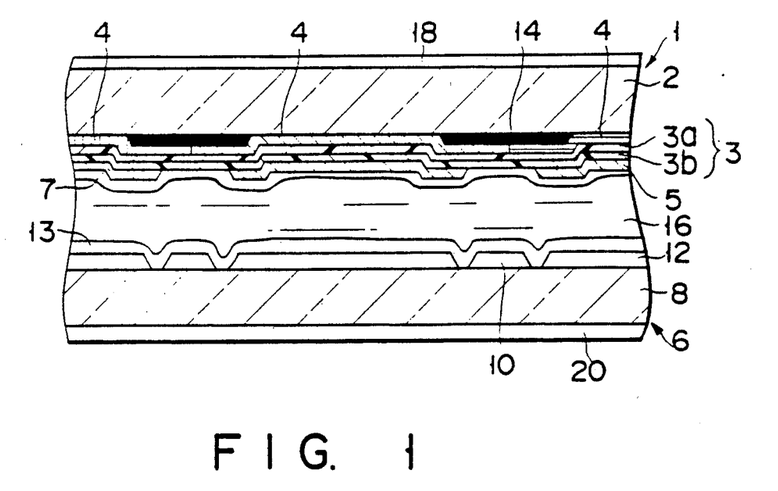
FIG. 1 is a sectional view of a liquid crystal display device according to the first embodiment of the present invention.

FIG. 1 shows the first embodiment of the present invention. The first embodiment provides an active-matrix type liquid crystal display device which employs MIM (i.e., metal insulator metal) elements as non-linear elements.

First substrate 1 comprises transparent substrate 2, and light-shielding film 14 and colored layers 4 (i.e., color filters) both formed on transparent substrate 2. Overcoat layer 3 is formed over first substrate 1. An ITO film is formed, by sputtering, on overcoat layer 3 such that the ITO film has a thickness in the range of 0.2 to 0.4 $\mu$m (preferably, a thickness of 0.25 $\mu$m). The ITO film is processed by photolithography into a stripe pattern corresponding to color layers 3, thereby forming transparent electrodes 5. Orientation film 7 is formed on transparent electrodes 5.

Second substrate 6 comprises transparent substrate 8, transparent pixel electrodes 12 arranged on substrate 8 in a matrix pattern, and wiring layer 10 located between pixel electrodes 12 and extending perpendicular to electrodes 5 of first substrate 1. Pixel electrodes 12 and wiring layers 10 are electrically connected together by MIM elements (not shown). Orientation film 13 is formed on the MIM elements.

First and second substrates 1 and 6 are arranged such that electrodes 5 and pixel electrodes 12 face each other. Liquid crystal layer 16, in which liquid crystal molecules are 90° twisted in succession between orientation layers 7 and 13, is located between electrodes 5 and pixel electrodes 12. Polarization plates 18 and 20 are arranged on the outer faces of first and second substrates 1 and 6, respectively, thereby providing a twisted nematic type liquid crystal display device.

Referring to FIGS. 2A to 2F, it will be described how the first of the color filter is made.

Figure 2A:
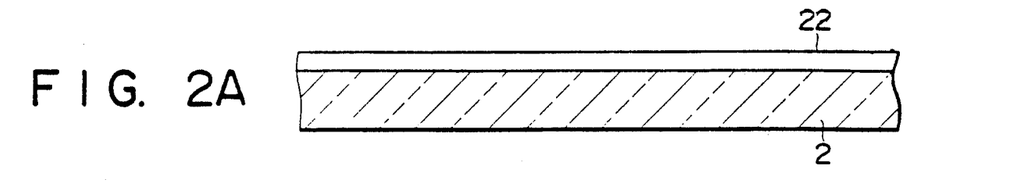
FIGS. 2A to 2F are sectional views for illustrating the manufacturing process of the color filter of the liquid crystal display device of the first embodiment.
Figure 2B:
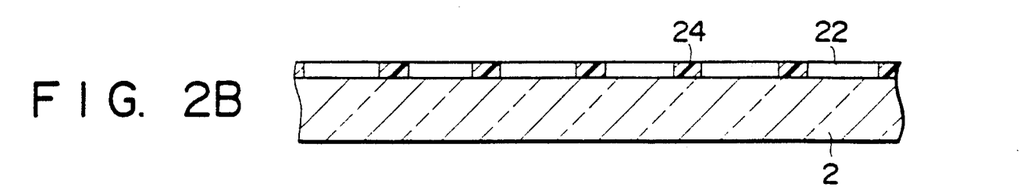
Figure 2C:
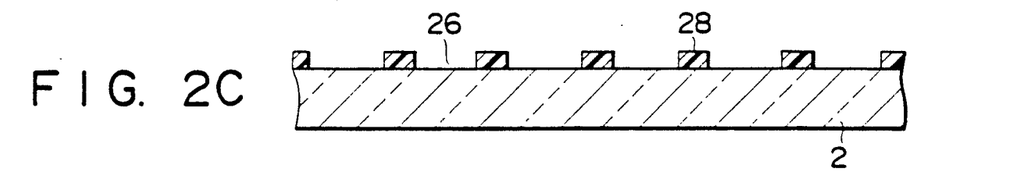
Figure 2D:
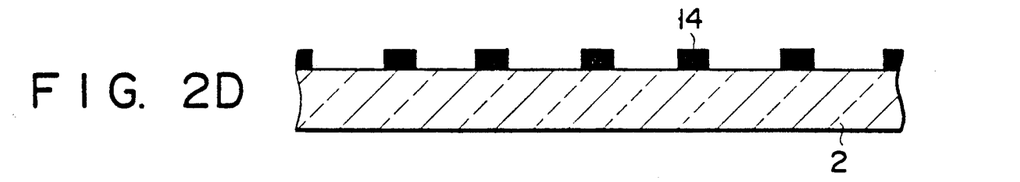
Figure 2E:
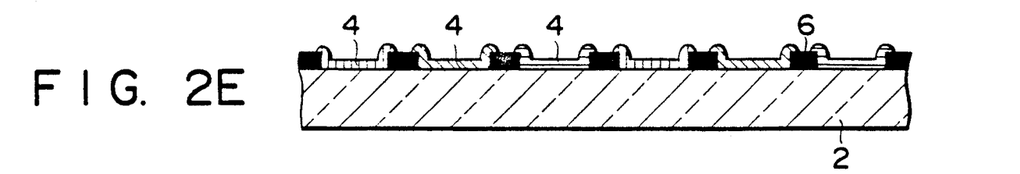
Figure 2F:
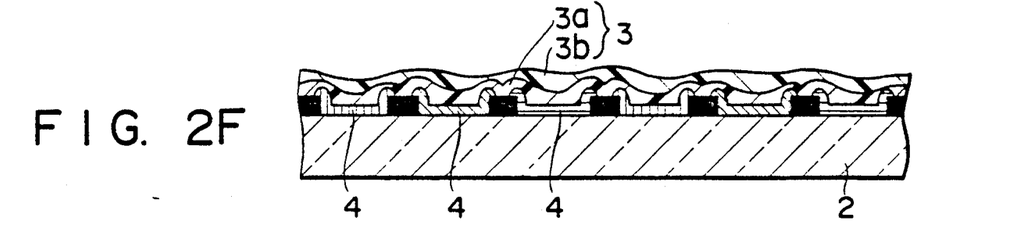

As shown in FIG. 2A, photosensitive dying material 22, 0.8 to 1.2 $\mu$m thick, is coated on transparent substrate 2 made of glass. A mask (not shown) is placed on photosensitive dying material 22 and ultraviolet rays are shot onto photosensitive dying material 22 through the mask. Latent images 24 are thus formed in photosensitive dying material 22 due to the cross-linking reaction of the material, as shown in FIG. 2B. Photosensitive dying material 22 is developed to form resin film 28, which has openings 26 formed according to a certain rule, as shown in FIG. 2C. Resin film 28 is hardened by baking and then dye-treated by acetic acid water, Black 181 (made by Nippon Kayaku), to form light-shielding film 14, as shown in FIG. 2D. As compared with resin film 28, the thickness of light-shielding film 14 increases to a greater extent of 1.5 $\mu$m because film 14 absorbs dye. Light-shielding film 14 is fixation-treated in a solution which includes tannic acid and emetic tartari. Colored layer 4 of red (R), green (G) and blue (B) are formed in openings 26 by printing resin inks having each other pigment, as shown in FIG. 2E. Colored layer 4 are fixed by baking. A surface of colored layer 4 thus formed is uneven, having a height of about 2 $\mu$m. In FIG. 2F first resin layer 3a is formed, 1.0 to 2.5 $\mu$m, more preferably 1.5 $\mu$m thick, by acryl resin which includes a solvent of cellosolve acetate in manner of spin coating. First resin layer 3a is heated at 90° to 120° C. for several or ten and several minutes to evaporate a part of its solvent and thus hardened. Second resin layer 3b is formed. 1.5 to 3.0 $\mu$m, more preferably 2.0 $\mu$m thick, on first resin layer 3a, which is a resin of the acryl group, by epoxy resin which includes the solvent of cellosolve acetate in manner of spin coating. First and second resin layers 3a and 3b form overcoat layer 3. Second resin layer 3b is then heated at 180° C. for 100 minutes and thus hardened completely.

According to this first embodiment of the present invention, first resin layer 3a of overcoat layer 3 is made of a resin of the acryl group which is excellent in wetting with the color filter of resin ink, while second resin layer 3b of overcoat layer 3 is made of epoxy resin which can be stable in forming ITO film. When ITO electrodes are formed, therefore, the occurrence of fine wrinkles and grain-like faults can be prevented on and in overcoat layer 3. The surface of overcoat layer 3 is a little undulated but 0.5 $\mu$m or less is counted from the top of this undulation to the bottom thereof even when colored layer 4 is concave and convex to have a distance of 4 $\mu$m between its top and bottom open points. It is preferable that the first resin layer is made thin and that the second resin layer is made thick, because the first resin layer is more heavily concave and convex.

As the first and second resin layers are made of organic resin, the color filter having the inorganic compound of overcoat layer can be manufactured on a higher productivity and at a low cost. It should be also noted that the inorganic layer has to be subjected to high-temperature heat treatment during the manufacturing process, with the result that it is very likely that the color filter comprising the inorganic layer will be adversely affected in quality. Such high-temperature heat treatment is not necessary in the manufacturing of the organic resin layer.

Figure 3:
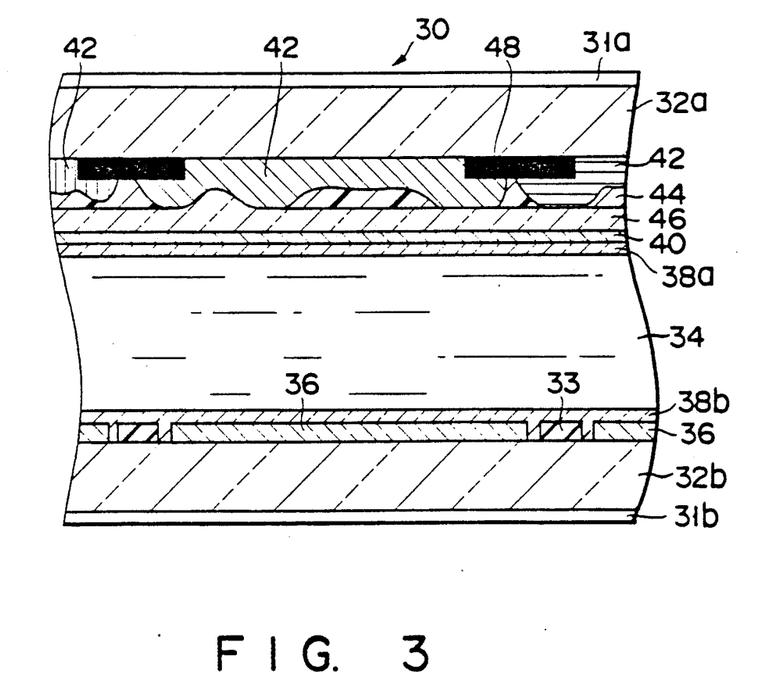
FIG. 3 is a sectional view of a liquid crystal display device according to the second embodiment of the present invention.

FIG. 3 shows the second embodiment of the present invention. The second embodiment provides an active-matrix type liquid crystal display device which employs TFT (i.e., thin film transistor) elements as switching elements.

According to the second embodiment, a color filter made up of light-shielding film 48 and colored layer 42 is formed on transparent substrate 32a. First layer 44, second layer 46, transparent electrode 40, and orientation film 38a are formed on the color filter in the order mentioned.

Signal line 33 and a gate line (not shown) are formed on transparent substrate 32b such that they are perpendicular to each other. Pixel electrode 36 is provided at the intersection between signal line 33 and the gate line through a TFT element (not shown). Orientation film 38b is formed on the resultant structure.

A pair of substrates 32a and 32b are arranged such that the electrodes and pixel electrodes 36 face each other. Liquid crystal layer 34, in which liquid crystal molecules are 90° twisted in succession between orientation layers 38a and 38b, is located between the electrodes and pixel electrodes 36. Polarization plates 31a and 31b are arranged on the outer faces of substrates 32a and 32b, respectively, thereby providing a twisted nematic type liquid crystal display device.

Light-shielding black films 48 are formed on that side of transparent substrate 32a, which faces liquid crystal layer 34, to enhance the contrast of display and protect the thin film transistor. Red, green and blue colored layers 42a, 42b and 42c are formed between light-shielding black films 48. First layer 44 which is made of epoxy resin including cellosolve acetate is formed on surfaces of colored layers 42a, 42b and 42c. The surface of first layer 44 is polished to expose a part of colored layers 42a, 42b and 42c.

Figure 4A:
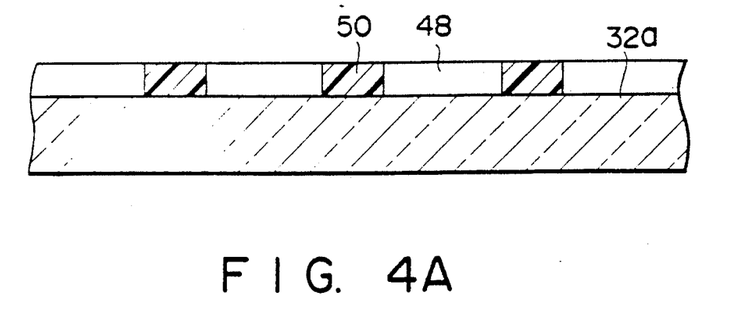
FIGS. 4A to 4F are sectional views for illustrating the manufacturing process of the color filter of the liquid crystal display device of the second embodiment.

Photosensitive dying material 48 is coated, 1.0 μm thick, on transparent substrate 32a. A mask is placed on photosensitive dying material 48 through the mask, and latent images 50 are formed at a certain interval on transparent substrate 32a due to the cross-linking reaction of material 48, as shown in FIG. 4A.

Figure 4B:
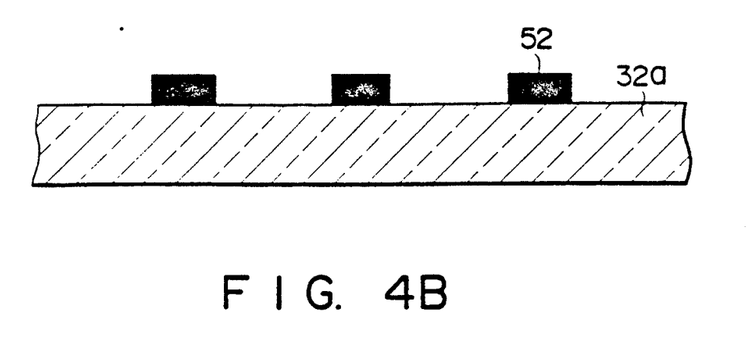

Photosensitive dying material 48 is removed, leaving latent images 50 on transparent substrate 32a. Latent images 50 are then baked and dyed by a black paint or Black 181 (made by Nippon Kayaku). They are further fixation-treated by a solution which includes tannic acid and emetic tartari, and light-shielding films 52 are formed as shown in FIG. 4B.

Figure 4C:
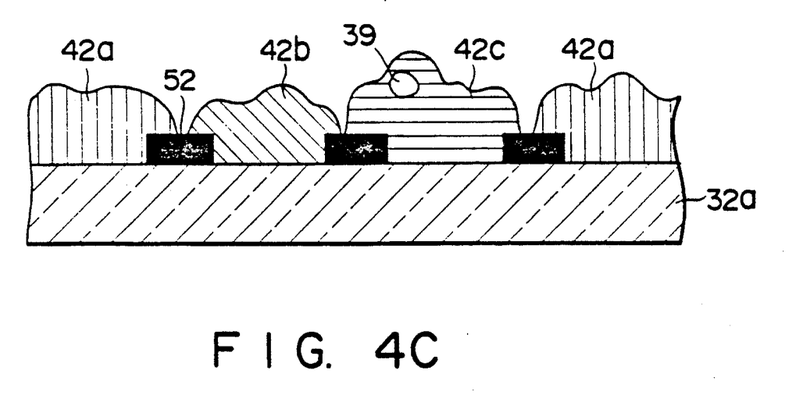

As shown in FIG. 4C, resin including red, green and blue pigments is attached between light-shielding films 52 according to the print process and then baked to form colored layers 42a, 42b and 42c. In order to enable desirable spectral characteristic, plural pigments are mixed in alkyd resin at a rate of about 10 to 20%. Each of the colored layers thus formed has an undulation of about 2.0 to 5.0 μm.

Figure 4D:
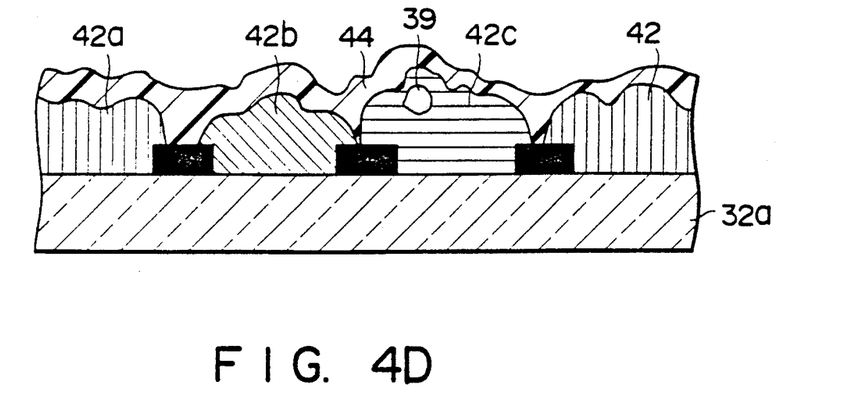

As shown in FIG. 4D, epoxy resin which includes ex. methyl cellosolve acetate having a solid part of 40% is coated, 1.0 μm thick, on colored layers 42a, 42b, 42c and light-shielding films 52 according to the spin coating manner. Epoxy resin is temporarily-hardened at 100° C. for ten minutes. Epoxy resin is not completely but temporarily hardened to make its grinding easy at the later process.

Figure 4E:
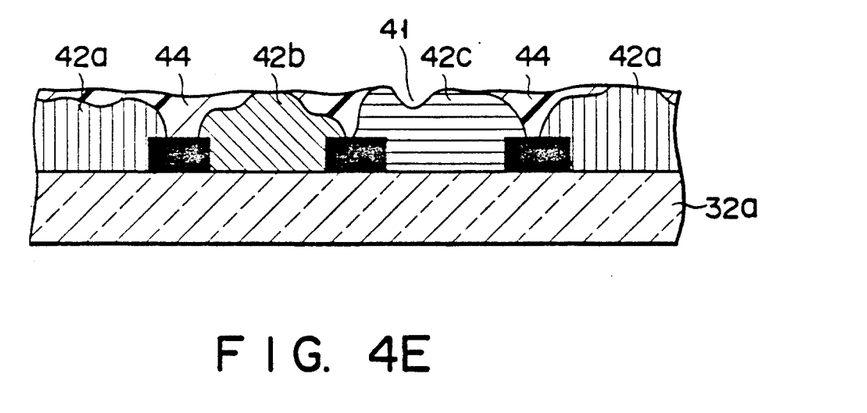

Cerium oxide (CeO) powder (having a diameter of 0.8 to 1.5 μm made by Mitsui Kinzoku) is used as abrasive and grinding relative to the epoxy resin is carried out under a pressure of 30 g/cm$^2$ for 15 minutes. The grinding or polishing technique here employed is intended to polish even a large area with little unevenness. When the epoxy resin is polished as described above, protruding portions of first layer 44 which are high in anti-abrasion are well polished to gradually become flat. First layer 44 is partly removed and the color layers are partly exposed. Colored layers 42a, 42b, and 42c are lower in anti-abrasion, as compared with first layer 44. They are therefore polished at a higher speed than first layer 44 is. The speed at which first layer 44 having protruding portions is polished can be thus made faster. The first layer and the colored layers are thus polished to form a flat surface, as shown in FIG. 4E.

Let it be assumed that foreign matter, such as a dust particle 39, enters the interior of colored layers 42a, 42b, and 42c, and that first layer 44 has a protruding portion caused by inclusion of the foreign matter. In this case, the colored layer located under the protruding portion of first layer 44 is exposed when first layer 44 is polished. At this time, the foreign matter is removed, leaving a depression portion 41 in the colored layer.

Figure 4F:
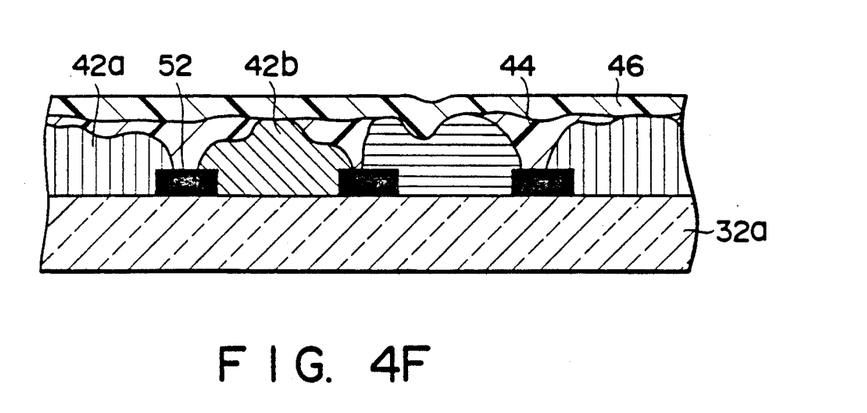

After first layer 44 is flattened, epoxy resin which is excellent in wetting property with first layer 44 is coated 3.0 μm thick, on first layer 44 according to the spin coating manner to form second layer 46 on first layer 44, as shown in FIG. 4F. The depression portion is covered with second layer 46.

Then, first and second layer 44 and 46 are baked, so first and second layer 44 and 46 are completely hardened.

After the above-described polishing, repeated coating, and baking process, ITO is attached, 200 angstroms thick, to the surface of color filter 42 according to the sputtering manner. Transparent electrode 40 is thus formed.

In the case of this color filter, the above-described manner enables the color filter to have a flat surface even if surfaces of colored layers 42a, 42b and 42c formed according to the print process are not so even. Further, the color filter is formed according to the print process and the like. This enables the cost of the color filter to be made sufficiently low. Even when transparent electrode 40 is arranged on the color filter and orientation film 38 then on transparent electrode 40, these transparent electrode 40 and orientation film 38 can be formed to have flatter surfaces. This enables liquid crystal layer 34 to be made operative at the whole of it and when liquid crystal layer 34 is employed, therefore, the liquid crystal display device can display images of higher quality. Furthermore, when first layer 44 is a thin film as described above, a no-modulated light is not passing through and transparent through the color filter is not mixed with other colors as one looks askance at the display device. This enables the display device to have a wider coverage angle and a higher contrast.

Although photosensitive dying material 48 has been coated 1.0 μm thick, it is not limited to this thickness and when its thickness is in a range of 0.8–1.2 μm, sufficient light shielding effect can be achieved. Although the surface of the color filter has been polished under the pressure of 30 g/cm$^2$ for 15 minutes, it may be polished under a pressure of 10–50 g/cm$^2$ for 15–20 minutes. Although the first layer has been formed, 1.0 μm thick, by epoxy resin, the film thickness of the first layer is not limited to this value but may be in a range of 1.0–3.0 μm. Light shielding film 52 may be formed on the side of electrode substrate 32b.

Although the color filter has been used by the TFT liquid crystal display device of the transparent type in the above-described cases, it can be applied to the other various kinds of the liquid crystal display devices.

Figure 5:
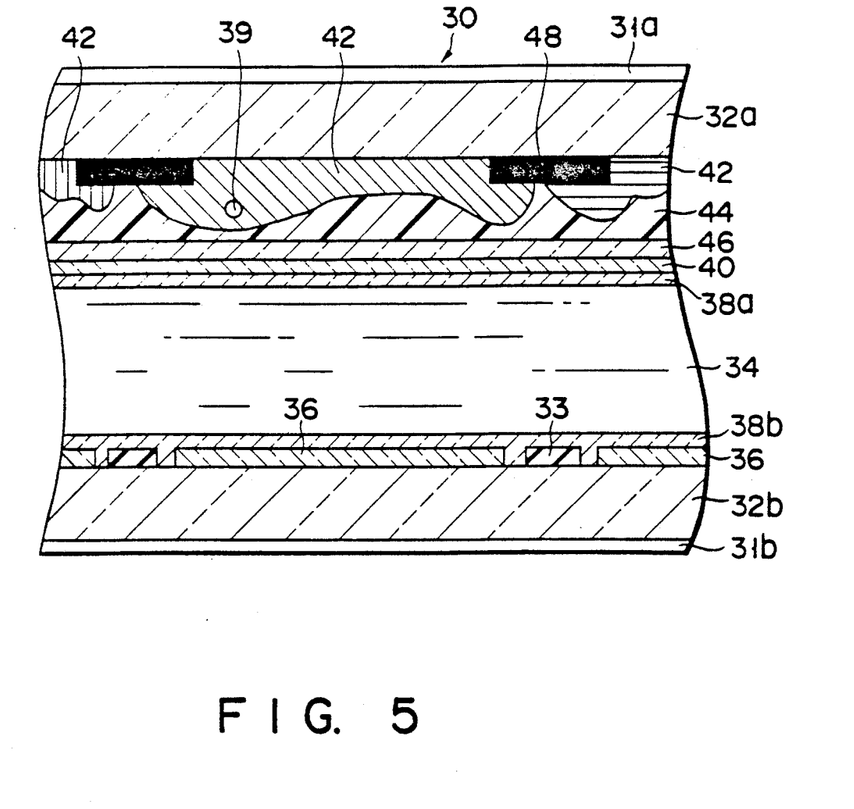
FIG. 5 is a sectional view of a liquid crystal display device according to a modification of the second embodiment.

A variation of the second example will be described. This variation is shown in FIG. 5 description on same parts as those of the second example will be omitted.

As seen in the second example, light shielding film 52 is formed on transparent substrate 32a and colored layers 42a, 42b and 42c are formed according to the print process. Epoxy resin which include ex. cellosolve acetate having a solid part of 40% is coated, 5.0 μm thick, on colored layers 42a, 42b, 42c or light shielding film 52 according to the spin coating manner. The epoxy resin is temporarily hardened at 100° C. for 10 minutes.

Cerium oxide (CeO) powder (having a diameter of 0.8-1.5 μm and made by Mitsui Kinzoku) is employed as abrasive to polish the epoxy resin under a pressure of 50 g/cm$^2$ for 60 minutes. The polishing technique here employed is intended to polish even a large area with little unevenness, as seen in the first example. When the epoxy resin is polished as described above, protruding portions of first layer 44 which are high in anti-abrasion are well polished to gradually become flat. First layer 44 is almost removed and is flatted, and the color layers portions are not exposed. But, at the protruding portion which is caused by bit dusts and different materials, first layer 44 is removed and the colored layers are exposed. This is rare case and this probability is very low. That is, the polishing time is relatively long, but the colored layers are not damaged, and the first layer can be flattened. The first layer and the colored layers can be thus polished to have a flat surface, as shown in FIG. 4E. Then, epoxy resin is coated, 3.0 μm thick, on first layer 44 to form second layer 46. This epoxy resin has excellent wetting characteristic with first layer 44, and first and second layers 44 and 46 are completely hardened, which enables the color filter to be formed, as shown in FIG. 4F.

After being polished and made flat as described above, the second layer is formed, and the first and second layers are completely hardened to form the color filter. Since first layer 44 is comparatively thick, the color filter can be made flat without exposing colored layers 42a, 42b and 42c from the surface of first layer 44 even when polishing is applied to first layer 44 for about 60 minutes as described above. Although the polishing has been carried out under the condition that pressure is 50 g/cm$^2$ and that time is 60 minutes, pressure and time are not limited to these values, but when it is conducted under a pressure of 10-50 g/cm$^2$ for 60-90 minutes, the color filter can be formed to have an excellent surface.

Although epoxy resin has been coated 5.0 μm thick in the case of this variation, the thickness of the epoxy resin may be in a range of 3.0-10.0 μm. Even when first layer 44 is polished, therefore, colored layers 42a, 42b and 42c will not be exposed. This makes it unnecessary to protect colored layers 42a, 42b and 42c. In addition, fine matters such as dust in colored layers 42a, 42b and 42c are not removed from them. The surface of the color filter can be thus polished quite flat.

In the case of this variation, too, the color filter can be formed to have an excellent surface, as described above, even when the colored layers which are formed according to the print process have not so flat surfaces. The print process and the like used enables the cost of the color filter to be made sufficiently lower, as compared with conventional cases. In addition, transparent electrode 40 and orientation film 38 obtained can have more excellent surfaces even when transparent electrode 40 is placed on the color filter and orientation film 38 then on transparent electrode 40. As the result, the liquid crystal layer can be made operative at the whole of it. When this liquid crystal layer is employed, therefore, the liquid crystal display device can display images of higher quality.

A third embodiment of the present invention will be described with reference to the drawings.

Figure 6:
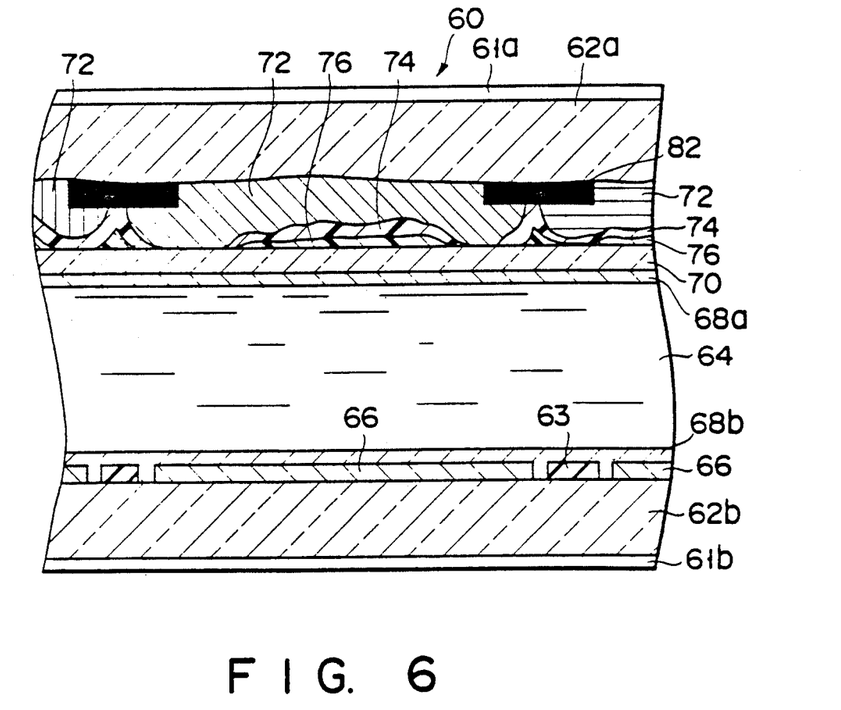
FIG. 6 is a sectional view of a liquid crystal display device according to the third embodiment of the present invention.

FIG. 6 shows the third embodiment of the present invention. Like the second embodiment, the third embodiment provides an active-matrix type liquid crystal display element which employs TFT elements as switching elements. The third embodiment differs from the second embodiment in the structure of the substrate on which a color filter is formed. As for the structure of the substrate on which a TFT element is formed, the third embodiment is similar to the second embodiment.

Light shielding films 82 are formed on that side of transparent substrate 62a, which faces liquid crystal layer 64, at a certain interval to enhance the contrast of display. Each of red, green and blue colored layers 72a, 72b and 72c is formed between light shielding films 82. First layer 74 which is an acryl resin layer including ex. cellosolve acetate is formed on light shielding films 82 and colored layers 72a, 72b, 72c. Second layer 76 which is an epoxy resin layer including cellosolve acetate having the same solvent is formed on first layer 74 which is of acryl resin. Convex portions of second layer 76 are polished smooth and flat to such an extent that colored layers 72a, 72b and 72c are exposed from layer 74 or 76 without being polished. The color filter constructed in this manner can be made flat even when colored layers 72a, 72b and 72c have concaves and convexes. This makes it easy to form transparent electrode 70 or orientation films 82 on the color filter. In other words, colored layers 72a, 72b and 72c can be formed according to the print process. As the result, the making of the color filter can be made simpler. In addition, the color filter for use with the liquid crystal display device can be provided on a lower cost.

Although light shielding films 82 have been arranged on the case of the above-described the glass substrate, light shielding films 82 may be formed after colored layers 72a, 72b and 72c are formed. Films 82 may be formed on the side of electrode substrate 62b.

Figure 7A:
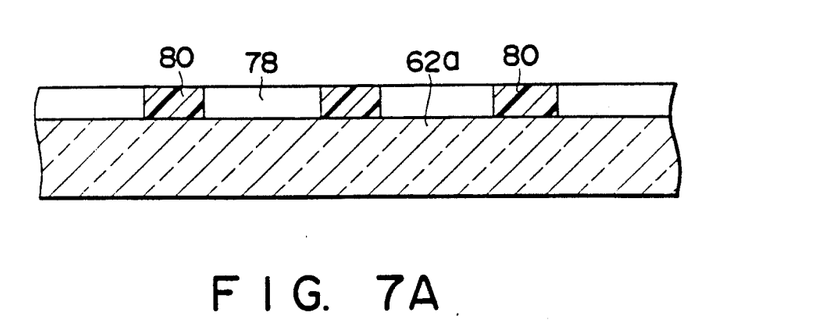
FIGS. 7A to 7F are sectional views for illustrating the manufacturing process of the color filter of the liquid crystal display device of the third embodiment.
Figure 7B:
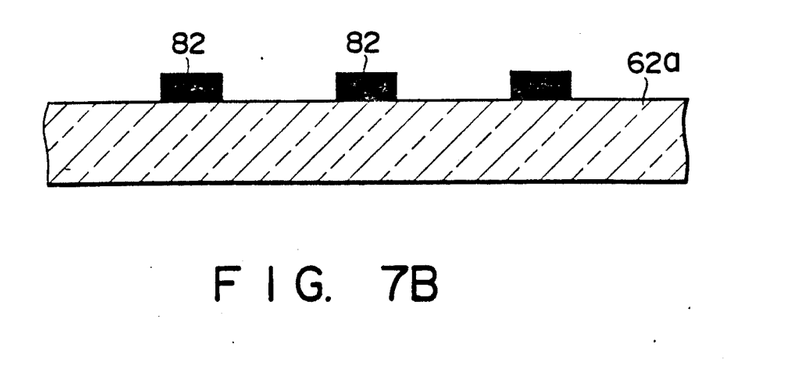

Photosensitive dying material 78 is coated, 1.0 μm thick, on that side of transparent substrate 62a which faces liquid crystal layer 64. A mask is placed on this photosensitive dying material 78 and ultraviolet rays are shot onto material 78 through the mask. Photosensitive dying material 78 is thus cross-linked to form latent images 80 on transparent substrate 62a at a certain interval, as shown in FIG. 7A. Photosensitive dying material 78 is removed leaving latent images 80 on transparent substrate 62a. Latent images 80 are baked and then treated by a pigment or Black 181 (made by Nippon Kayaku). After dye-treated, latent images 80 are further fixation-treated by a solution including tannic acid and emetic tartari, and light shielding films 82 are formed as shown in FIG. 7B.

Figure 7C:
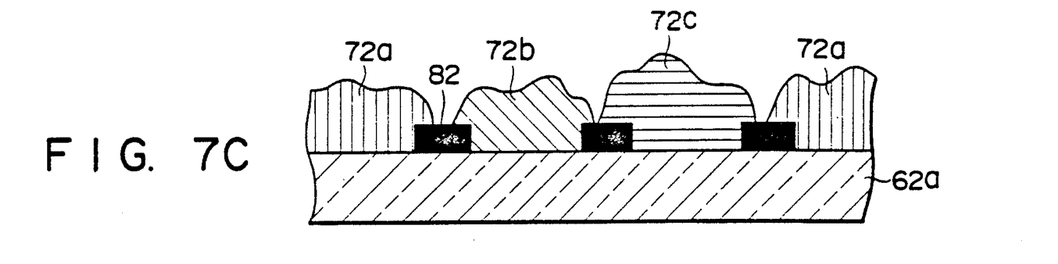

As shown in FIG. 7C, red, green and blue colored layers 72a, 72b and 72c are then successively formed according to the print process. Colored layers 72a, 72b and 72c are fixed by baking. When they are fixed like this, colored layers 72a, 72b and 72c include foreign matters or they are not even, have concaves and convexes which are 2.0-5.0 μm deep from their top to their bottom because the print process still has technical problems.

Alkyd resin in which plural pigments as printing inks are mixed at a rate of 10-20% is used to provide colored layers 72a, 72b and 72c with desirable spectral characteristics.

Figure 7D:
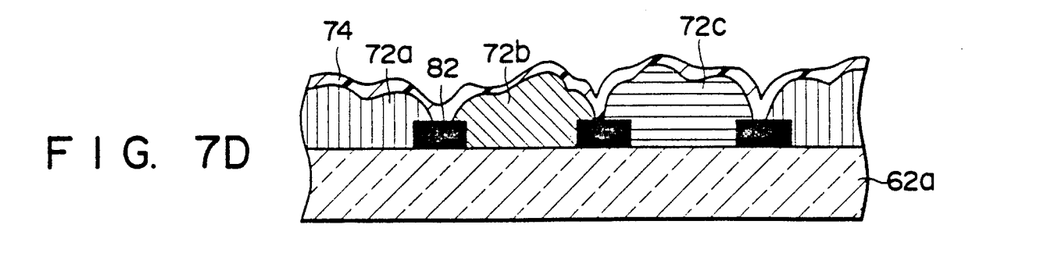

Acryl resin including ex. cellosolve acetate is coated, 0.2 μm thick, on colored layers 72a, 72b, 72c and light shielding films 82 according to the spin coating manner, as shown in FIG. 7D. First layer 74 thus formed is heated and hardened at 100° C. for 10 minutes. The acryl resin including cellosolve acetate is excellent in wetting with colored layers 72a, 72b and 72c. When another layer is to be formed on colored layers 72a, 72b and 72c, therefore, the adhesion between this layer and the colored layers can be good.

Figure 7E:
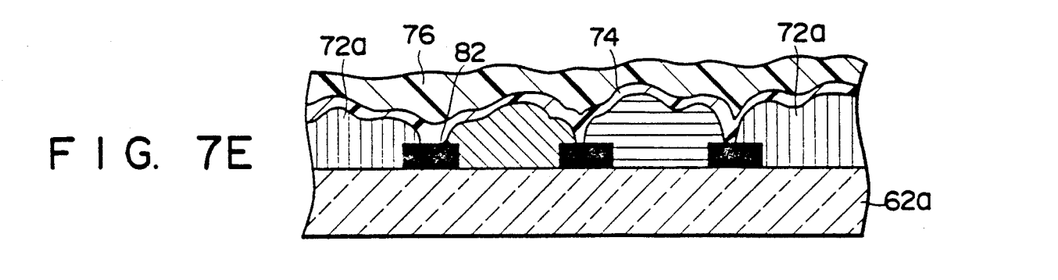

Second layer 76 made of epoxy resin including cellosolve acetate having the same solvent at a solid part of 40% is coated, 1.0 μm thick, on first layer 74 according to the spin coating manner, as shown in FIG. 7E. Second layer 76 coated on first layer 74 is then heated and temporarily hardened at 100° C. for 10 minutes. When the film thickness of second layer 76 is in a range of about 0.5-2.0 μm, the surface of the color filter can be made sufficiently flat even after second and first layers 76 and 74 are polished.

Figure 7F:
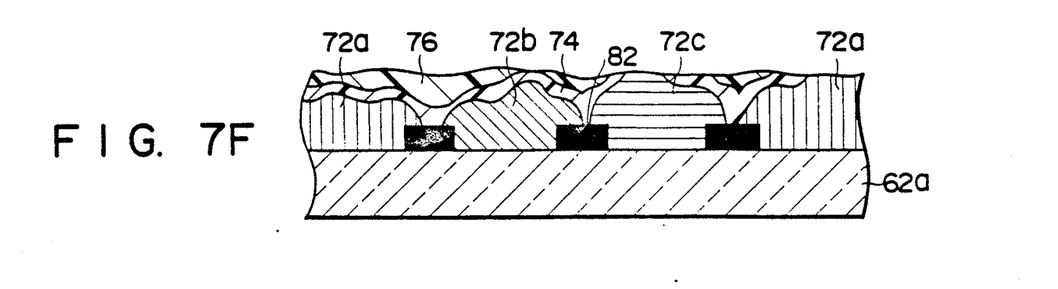

Cerium oxide (CeO) powder (having a diameter of 0.8-1.5 μm and made by Mitsui Kinzoku) is used as abrasive and polishing is carried out under a pressure of 30 g/cm$^2$ for 15 minutes, as shown in FIG. 7F. The polishing technique here employed is intended to polish even a large area with little unevenness, as described above. When the polishing is carried out under the above-mentioned condition, protrusion of second layer 76 which are high in anti-abrasion are well polished and gradually made flat. Second layer 76 is partly removed and the color layers are partly exposed. Colored layers 72a, 72b and 72c are polished faster than second layer 76 is, because they are lower in anti-abrasion as compared with second layer 76. As the result, they can be polished to have a flat surface. After second layer 76 is completely hardened, ITO is attached, 200 angstroms thick, to second layer 76 according to the sputtering manner to form transparent electrode 70.

In the case of this embodiment, too, the color filter can be formed to have a flat surface according to the above-mentioned manner even when colored layers 72a, 72b and 72c formed according to the print process have surfaces which are not so flat. Since the print process and the like can be used to form the color filter, the cost of the color filter can be made sufficiently lower. Even when transparent electrode 70 is placed on the color filter and orientation film 68 then on transparent electrode 70, transparent electrode 70 and orientation film 68 can be formed to have flatter surfaces, as compared with conventional ones. Liquid crystal layer 64 can be thus made operative at the whole of it and this makes it possible to provide a liquid crystal display device which can display images of higher quality. Further, when first layer 74 is such a thin film as described above, a no-modulated light will be passing through merely, and transparent through the color filter will not be mixed with other colors, as one looks askance at the display device. This enables the display device to have a wider coverage angle and a higher contrast of display.

Although photosensitive dying material 78 has been coated 1.0 μm thick, its thickness is not limited to this but when it is in a range of 0.8-1.2 μm, sufficient light shielding effect can be achieved. Although the surface of the color filter has been polished under a pressure of 30 g/cm$^2$ for 15 minutes, the polishing may be carried out under a pressure of 10-50 g/cm$^2$ for 15-20 minutes. Although the first layer has been formed 0.2 μm thick by acryl resin, the film thickness of the first layer is not limited to this value but may be smaller than 1.0 μm. Although the first layer has been made of acryl resin, alkyd, polyamide and other resins may be used. Light shielding films 52 may be formed on the side of electrode substrate 32b. Although the second layer has been formed 1.0 μm thick, the film thickness of the second layer is not limited to this value, but when it is in a range of 5.0-10.0 μm, the polishing cannot reach the color portions. This enables excellent transparent electrodes to be formed on the second layer.

In variations of the third embodiment, third layer may be formed on the second layer. The third layer is selected from many kinds of material fitting for ITO layer.

What is claimed:

1. A liquid crystal display device comprising:
    a first electrode substrate having a first transparent substrate, a color filter and a first electrode disposed adjacently;
    a second electrode substrate having a second transparent substrate and a second electrode disposed adjacently; and
    a liquid crystal material sandwiched between said first and second electrode substrate;
    wherein said color filter has a transparent colored layer and a plurality of resin layers provided on said colored layer, and said first electrode is provided on said plural resin layers.

2. A liquid crystal display device according to claim 1, wherein at least one of said plurality of resin layers has an abraded surface.

3. A color filter comprising:
    a transparent substrate;
    a transparent colored layer arranged on said transparent substrate;
    a plurality of resin layers provided on said transparent colored layer; and
    a transparent conductive electrode layer provided on said plurality of resin layers.

4. A color filter according to claim 3, wherein said plurality of resin layers has a first acryl resin layer and a second epoxy resin layer.

5. A color filter according to claim 3, wherein at least one of said plurality of resin layers has an abraded surface.

6. A color filter according to claim 5, wherein said resin layer having said abraded surface is made of a material that is harder and more difficult to polish than said colored layer.

7. A color filter according to claim 6, wherein said resin layer having said abraded surface is made of at least one resin selected from the group consisting of epoxy resin, polyimide resin, polyamide resin silicone resin, and compounds of these resins.

8. A color filter according to claim 5, wherein part of said colored layer is covered with said resin layer having said abraded surface.

9. A color filter according to claim 5, wherein all of said colored layer is covered with said resin layer having said abraded surface.

10. A color filter according to claim 5, wherein said plurality of resin layers includes a first resin layer having said abraded surface and a second resin layer provided on said first resin layer.

11. A color filter according to claim 5, wherein said plurality of resin layers includes a first resin layer and a second resin layer having said abraded surface provided on said first resin layer.

12. A color filter according to claim 11, wherein said first resin layer is made of at least one resin selected from the group consisting of acryl resin, alkyd resin, and polyamide resin.

13. A color filter according to claim 5, wherein said plurality of resin layers includes a first resin layer, a second resin layer having said abraded surface provided on said first resin layer and a third resin layer provided on said second resin layer.

* * * * *